US010609902B2

(12) United States Patent
Peper, Jr. et al.

(10) Patent No.: US 10,609,902 B2
(45) Date of Patent: Apr. 7, 2020

(54) ANIMAL WEARABLE HEAD MOUNTABLE DISPLAY SYSTEM

(71) Applicant: Command Sight, Inc., Seattle, WA (US)

(72) Inventors: Alan Robert Peper, Jr., Seattle, WA (US); Nenad Nestorovic, Seattle, WA (US)

(73) Assignee: COMMAND SIGHT, INC., Seattle, WA (US)

( * ) Notice: Subject to any disclaimer, the term of this patent is extended or adjusted under 35 U.S.C. 154(b) by 0 days.

(21) Appl. No.: 16/030,672

(22) Filed: Jul. 9, 2018

(65) Prior Publication Data

US 2019/0037806 A1 Feb. 7, 2019

Related U.S. Application Data

(60) Provisional application No. 62/537,883, filed on Jul. 27, 2017, provisional application No. 62/581,501, filed on Nov. 3, 2017.

(51) Int. Cl.
| | | |
|---|---|---|
| *A01K 15/02* | (2006.01) | |
| *G09G 5/00* | (2006.01) | |
| *G02B 27/01* | (2006.01) | |
| *A01K 29/00* | (2006.01) | |
| *G06F 3/14* | (2006.01) | |

(52) U.S. Cl.
CPC ............ *A01K 15/021* (2013.01); *A01K 29/00* (2013.01); *G02B 27/0172* (2013.01); *G06F 3/1454* (2013.01); *G09G 5/003* (2013.01); *G02B 2027/0138* (2013.01); *G09G 2340/12* (2013.01); *G09G 2340/125* (2013.01); *G09G 2354/00* (2013.01); *G09G 2370/16* (2013.01)

(58) Field of Classification Search
CPC .. A01K 15/021; A01K 29/00; G02B 27/0172; G09G 5/003
USPC ............................... 345/8; 600/546; 701/300
See application file for complete search history.

(56) References Cited

U.S. PATENT DOCUMENTS

| | | | |
|---|---|---|---|
| 3,373,444 A | 3/1968 | Militello | |
| 5,732,415 A * | 3/1998 | Boyd ....................... | A61D 9/00 2/426 |
| 7,372,370 B2 * | 5/2008 | Stults ...................... | G08B 1/08 340/286.06 |

(Continued)

FOREIGN PATENT DOCUMENTS

| | | |
|---|---|---|
| DE | 102014001041 A1 | 7/2015 |
| WO | 2016025443 A1 | 2/2016 |

OTHER PUBLICATIONS

K-9 Storm Intruder, Real-Time Encrypted Camera; retrieved online on Jun. 21, 2018 from url: http://www.k9storm.com/intruder, 3 pages.

(Continued)

*Primary Examiner* — Prabodh M Dharia
(74) *Attorney, Agent, or Firm* — Perkins Coie LLP

(57) ABSTRACT

An animal-wearable head-mountable display (AW-HMD) device comprises a head fitting designed to fit the head of an animal, and an output subsystem coupled to or integral with the head fitting and configured to output a signal to the animal. The device can comprise an optical module configured to project images into an eye of the animal, and various other modules, such as an audio module, a tactile module and/or an olfactory module.

20 Claims, 14 Drawing Sheets

(56) References Cited

U.S. PATENT DOCUMENTS

| | | | | |
|---|---|---|---|---|
| 9,516,862 | B1* | 12/2016 | Emilo | A01K 13/006 |
| 10,094,855 | B1* | 10/2018 | Fuhr | G01R 13/0281 |
| 10,521,940 | B2* | 12/2019 | Cricri | H04W 4/023 |
| 2004/0130681 | A1* | 7/2004 | Aastuen | G02B 27/149 |
| | | | | 353/20 |
| 2005/0151924 | A1 | 7/2005 | Di et al. | |
| 2008/0141681 | A1 | 6/2008 | Arnold | |
| 2008/0243385 | A1* | 10/2008 | Yamamoto | G01C 21/005 |
| | | | | 701/300 |
| 2009/0171233 | A1* | 7/2009 | Lanfermann | A61B 5/0488 |
| | | | | 600/546 |
| 2012/0206335 | A1 | 8/2012 | Osterhout et al. | |
| 2013/0103360 | A1 | 4/2013 | Hsu | |
| 2014/0247951 | A1* | 9/2014 | Malaviya | H04R 1/105 |
| | | | | 381/74 |
| 2014/0304891 | A1 | 10/2014 | Waters | |
| 2014/0313225 | A1 | 10/2014 | Lee et al. | |
| 2015/0054716 | A1 | 2/2015 | Hirabayashi et al. | |
| 2015/0279022 | A1* | 10/2015 | Shuster | H04N 13/332 |
| | | | | 345/427 |
| 2016/0063767 | A1 | 3/2016 | Lee et al. | |
| 2017/0072316 | A1 | 3/2017 | Finfter | |
| 2017/0092235 | A1* | 3/2017 | Osman | G06F 3/012 |
| 2017/0108697 | A1 | 4/2017 | El-Ghoroury et al. | |
| 2017/0135315 | A1 | 5/2017 | Marmen et al. | |
| 2017/0153672 | A1 | 6/2017 | Shin et al. | |
| 2018/0181196 | A1 | 6/2018 | Lee et al. | |
| 2018/0253856 | A1 | 9/2018 | Price et al. | |
| 2019/0068850 | A1* | 2/2019 | Peper, Jr. | H04N 5/2256 |

OTHER PUBLICATIONS

K9 Vision System; retrieved online on Jun. 21, 2018 from url: https://prok9supplies.com/k9-vision-system-for-sale.html; 10 pages.

WolfPAK K9 ISR—Advanced Canine (K9) Camera System; MissionTEQ; retrieved online on Jun. 21, 2018 from url: http://missionteq.com/canine-camera-system; 7 pages.

International Search Report and Written Opinion dated Oct. 2, 2018 for PCT Application No. PCT/US18/42889 of Command Sight, Inc., filed on Jul. 19, 2018, 9 pages.

Int'l Search Report and Written Opinion dated Jan. 18, 2019 for PCT Application No. PCT/US18/58917 of Command Sight, Inc., filed on Nov. 2, 2018, 12 pages.

K9 Vision System, Full Version; https://prok9supplies.com/k9-vision-system-k9-vision-system-full-version-kvfv4.html, 4 pages.

K9 HELM head protection for working dogs; Trident K9 Tactical Helmet; retrieved online from url: www.k9helm.com/trident-helmet, 2018, 4 pages.

Williams, Fiona , et al., "Development of a Head-mounted, Eye-tracking System for Dogs", Journal of Neuroscience, vol. 194, Issue 2; retrieved online from url: http://eprints.lincoln.ad.uk/3673/1/Development_of_a_head-mounted%2C_eye-tracking_system_for_dogs.pdf, Jan. 15, 2011, pp. 259-265.

Non-Final Office Action dated Oct. 11, 2019 for U.S. Appl. No. 16/178,384 of Peper, Jr. et al., filed Nov. 1, 2018.

* cited by examiner

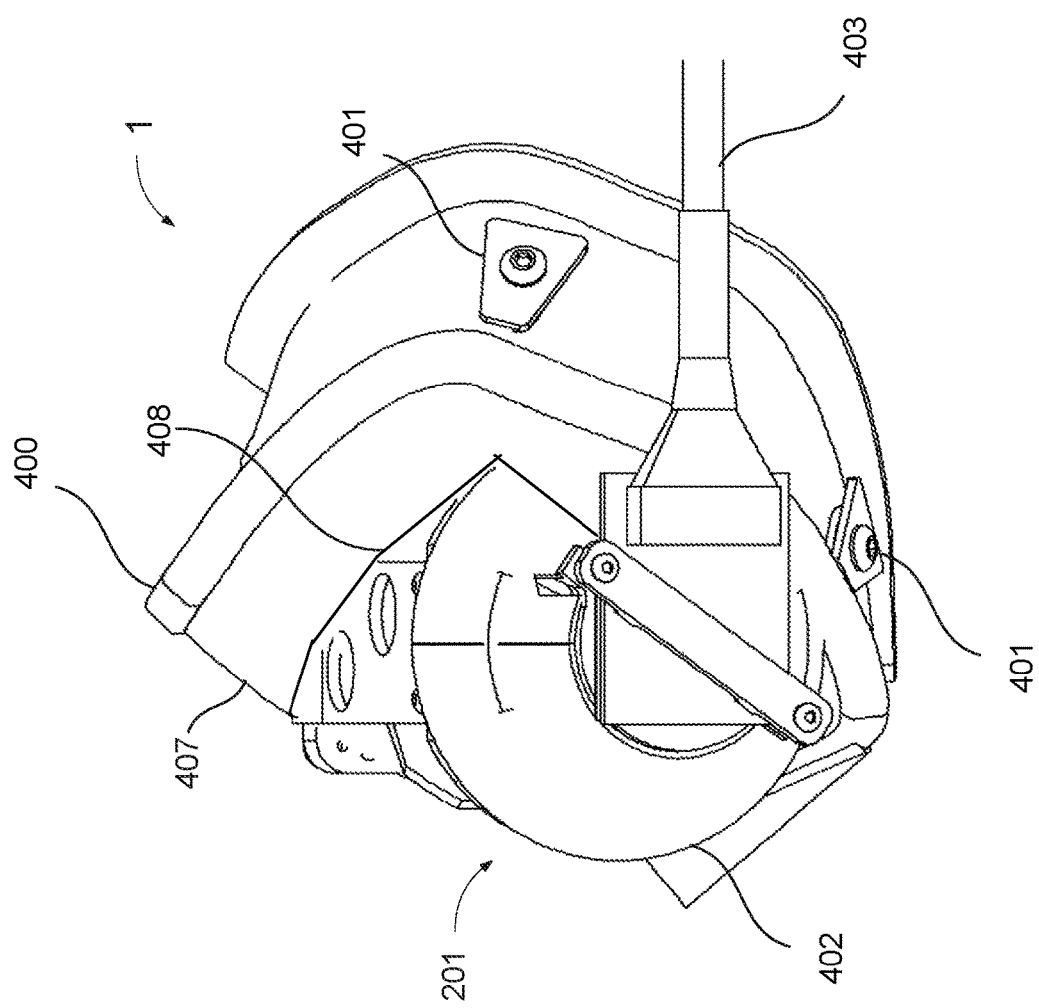

ANIMAL WEARABLE HEAD MOUNTABLE DISPLAY SYSTEM

This application claims the benefit of U.S. provisional patent application No. 62/581,501, filed on Nov. 3, 2017, and U.S. provisional patent application No. 62/537,883, filed on Jul. 27, 2017, each of which is incorporated by reference herein in its entirety.

FIELD

At least one embodiment of the present disclosure pertains to head-mountable display devices, and more particularly, to a head-mountable display device designed to be worn by an animal.

BACKGROUND

Head mountable display (HMD) devices are available on the market today, but they are designed only for use by humans. Thus, their current form factors, optical arrays and software are not suitable for use with animals. Additionally, certain camera products are available that can be put on an animal and used to acquire images approximately from the animal's perspective, such as GoPro cameras, which can be put on a dog's back. However, these products are also generally intended for human use and are not optimal for use with animals, due to problems with image stability and other factors.

BRIEF DESCRIPTION OF THE DRAWINGS

One or more embodiments of the present disclosure are illustrated by way of example and not limitation in the figures of the accompanying drawings, in which like references indicate similar elements.

FIG. 4A shows a side view of an embodiment in which the optical module is integrated with goggles.

DETAILED DESCRIPTION

Figure 1:
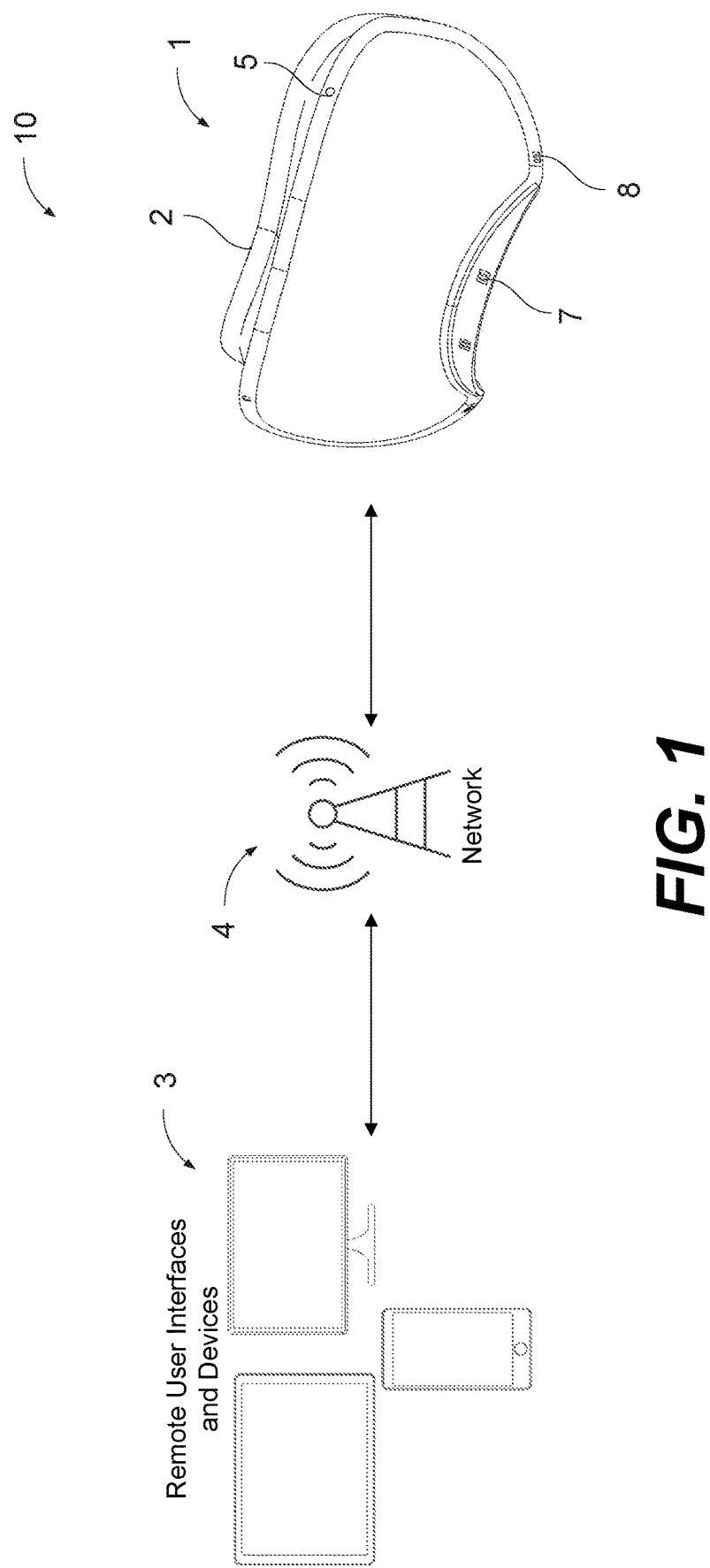
FIG. 1 illustrates an overview of an Animal Wearable Head Mountable Display (AW-HMD) system.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced herein are a device and system for communication between an animal and its human handler, that enables direct, specific communication of instructions to the animal, such as regarding desired direction and/or desire of the handler. Note that the term "animal" as used herein is intended to exclude humans. The system includes an Animal Wearable Head Mountable Display (AW-HMD) device that provides visual cues directly to an animal at the direction of the handler, who may be located remotely from the animal (i.e., not within the animal's normal range of hearing or vision). The system also enables direct viewing by a human of the animal's visual perspective. Further, the system may provide nonvisual signals to the animal, such as tactile (e.g., haptic), auditory or olfactory signals, or any combination thereof, which may be based on remote user inputs from the human handler.

At least some of the embodiments of the AW-HMD device introduced here comprise a headset portion that includes a head fitting in the form of a ruggedized goggle designed to accommodate the distinct form factor of an animal's head (generally though not necessarily designed to optimally fit a particular animal species), a light source, a lens array, camera optics, and controls and feedback mechanisms for auditory, olfactory and/or tactile data. The AW-HMD enables viewing by a human of an animal's direct line of sight and visual communication of images back into the line of sight of the animal. The device can be used to provide signals to the animal so that there is no ambiguity in direction, target, or any other visual reference point. The AW-HMD device can include non-visual sensors, multiple cameras and integrated optical equipment and associative computing and processing power. These components may include optics equipment (e.g., display, one or more lenses, beamsplitter) to display visual content to the animal, an outward facing camera to capture the animal's line of sight, and an inward facing camera to address alignment between the animal's eye and optics and/or to perform eye tracking. Additional sensory and spectral detection sensors can also be included, along with custom-designed software to address issues related to mammal-specific visual acuity and/or other species-specific visual acuity.

The AW-HMD device disclosed herein is designed for animals, with at least some contemplated embodiments being particularly designed for mammals, and more particularly, for canines. However, the principles introduced here can additionally or alternatively be applied and/or adapted for use with other species, including non-mammalian species. At least some embodiments of the system introduced here have the following capabilities: (1) permit delivery of information into the line of sight and/or perception of the animal without discernment of such information by third parties; (2) provide direct line of sight ("first-person" viewing) of what the animal sees (here the term "person" in "first-person" does not refer to a human); (3) integrate olfactory responses into the design; (4) adjust for varied lighting scenarios; (5) automatically calibrate to the eye position of the animal; (6) integrate haptic controls for additional communications; and (7) integrate audio controls for bi-directional audio communication.

At least some embodiments of the AW-HMD system may also have one or more of the following: a near field-light source, an optical array, a flexible near-to-eye display (NED), an infrared camera and imaging to detect heat sources, optical arrays for use in veterinary/clinical practices to test animal visual acuity, spectral sensors to detect external anomalies, audio components, pupil tracking, and/or haptics.

FIG. 1 shows an overview of the AW-HMD system. The AW-HMD system 10 in the illustrated embodiment includes an AW-HMD device 1 that includes a headset portion comprising goggles 2 to be worn on the head of the animal, such that the goggles 2 cover one or both eyes of the animal. The AW-HMD device 1 can perceive the outside world and is aware of objects and conditions in the environment through sensors such as range finders, IR sensors, camera(s), or the like. The AW-HMD device 1 may communicate through a networked connection 4 (e.g., via one or more wired and/or wireless networks) with remote user interfaces and device 3. The remote user interfaces and device 3 may provide a user interface to allow a human user to control functions of the AW-HMD device 1 through a networked connection 4. Through the networked connection 4 and an audio module 5 in the AW-HMD device 1, a user can use the remote user interfaces and device 3 to communicate bi-directionally with the AW-HMD device 1 and to communicate with the animal.

The AW-HMD device 1 may have any of various different form factors to fit any of various different functional and anthropomorphic requirements. In some embodiments, the AW-HMD device 1 may be designed with conventional goggles 2, as noted above. The goggles 2 may at least partially enclose active computer graphics displays, which may be configured as see-through (at least partially transparent) displays, such that digital imagery and objects can be overlaid on the animal's view of its environment. Any of various see-through display technologies and optical designs may be used, such as emissive displays (e.g., light emitting diode (LED), organic LED (OLED), or active-matrix OLED (AMOLED)), holographic displays, or the like. The optical configuration may include a single reflexive display, monocular display, or binocular display.

The AW-HMD device 1 may also have a number of integrated computing elements, which may include one or more integrated microprocessors and/or digital signal processors (DSPs), power management, as well as wired and wireless communications transceivers (e.g., for universal serial bus (USB), cellular, WiFi, Bluetooth, mesh connections, etc.). The AW-HMD device 1 may also have one or more positional sensors, such as global positioning system (GPS) circuitry, accelerometers, inertial measurement unit (IMU), or the like. It may also have other sensors, such as a camera(s), rangefinders, microphones, speakers, hyperspectral camera, spectral illuminators, temperature sensors, olfactory detection, Geiger counter, and the like.

Some embodiments of the AW-HMD device 1 may include eye-tracking sensors to determine and assist in the alignment of the optical display(s) to the animal's eye(s). Data gathered by eye-tracking sensors may also be made available through a networked connection 4 to remote user interfaces and devices 3, such that the external interfaces and devices 3 can be alerted to changes in the eye-box relative to the animal's active field of view (FOV). Additionally, embodiments of the AW-HMD device 1 may also optimize the delivery of imagery to the animal through the display such that colors are optimized for the animal or animal species (e.g., dichromacy for canines) as well as for optimal contrast. Additionally, the AW-HMD device 1 may generate images and objects for display to the animal by using shapes optimized for the visual perception capabilities of a particular animal or animal species, which shapes may include linear, oblong, elliptical, orbicular, lanceolate, ovate, oblanceolate, obvate, triangular and deltate shape types.

The AW-HMD device 1 may also have integrated command and control features, which may include contextually based control, active control, user control, remote control, passive control, or the like. For example, the AW-HMD device 1 may have an integrated sensor, such as a camera and associated detection circuitry that can perform object recognition (e.g., facial, landmark, or the like) on captured images, such that the integrated processing system can interpret an object and relay an indication of the identified object to the remote user interfaces and device 3 through a networked connection 4. The AW-HMD device 1 may also provide various types of signals to the animal directly (automatically and/or based on user inputs) through the optical display.

The AW-HMD device 1 may also adjust itself based on measured or perceived environmental conditions, such as ambient light. For example, in dark environments the AW-HMD device 1 may decrease the level of contrast of a digitally displayed object or image. In some embodiments, the control technology may be mounted on the AW-HMD device 1 such that a user can make manual adjustments directly to the AW-HMD device 1. Alternatively or additionally, some embodiments may include the ability to make adjustments to the contrast of displayed objects through an remote user interface and device 3 through a networked connection 4.

Additionally, some embodiments of the AW-HMD device 1 may include active sensory feedback. For example, embodiments of the AW-HMD device 1 may have integrated olfactory delivery capability, such that a user connected through a networked remote user interface 3 may trigger delivery of olfactory cues through an olfaction sensor and delivery component 7 on the AW-HMD device 1, to provide signals to the animal. Some embodiments of AW-HMD device 1 may also include haptic feedback elements 8 to provide signals to the animal. For example, a user, through a network connection 4 and an remote user interface or device 3, may input into the remote user interface 3 to activate the haptic feedback elements 8 on AW-HMD device 1.

Some embodiments of the AW-HMD device 1 may have sensors that detect movement of the animal (e.g., pace change, position, and the like) including accelerometers, gyros, and other internal measurements, where the integrated processors may interpret the tracked movement and provide quantitative and qualitative measurements of the animal's position and/or motion to the remote user interfaces and device 3.

As noted above, the AW-HMD device 1 may be in communication with remote user interfaces 3. The remote user interfaces 3 may be generated by devices having any of various different forms. For example, a cell phone screen may be adapted to receive input from AW-HMD device 1 and may be set up to actively control functional aspects of the AW-HMD device 1. The remote user interface 3 may additionally or alternatively include other forms, such as one or more tablets, laptop computers, desktop computers, or the like. In each case, the remote user interface may also include sensors (e.g., IMU, accelerometers, compass, temperature, and the like) to provide additional input in controlling the AW-HMD device 1 and instructing the animal.

Figure 2A:
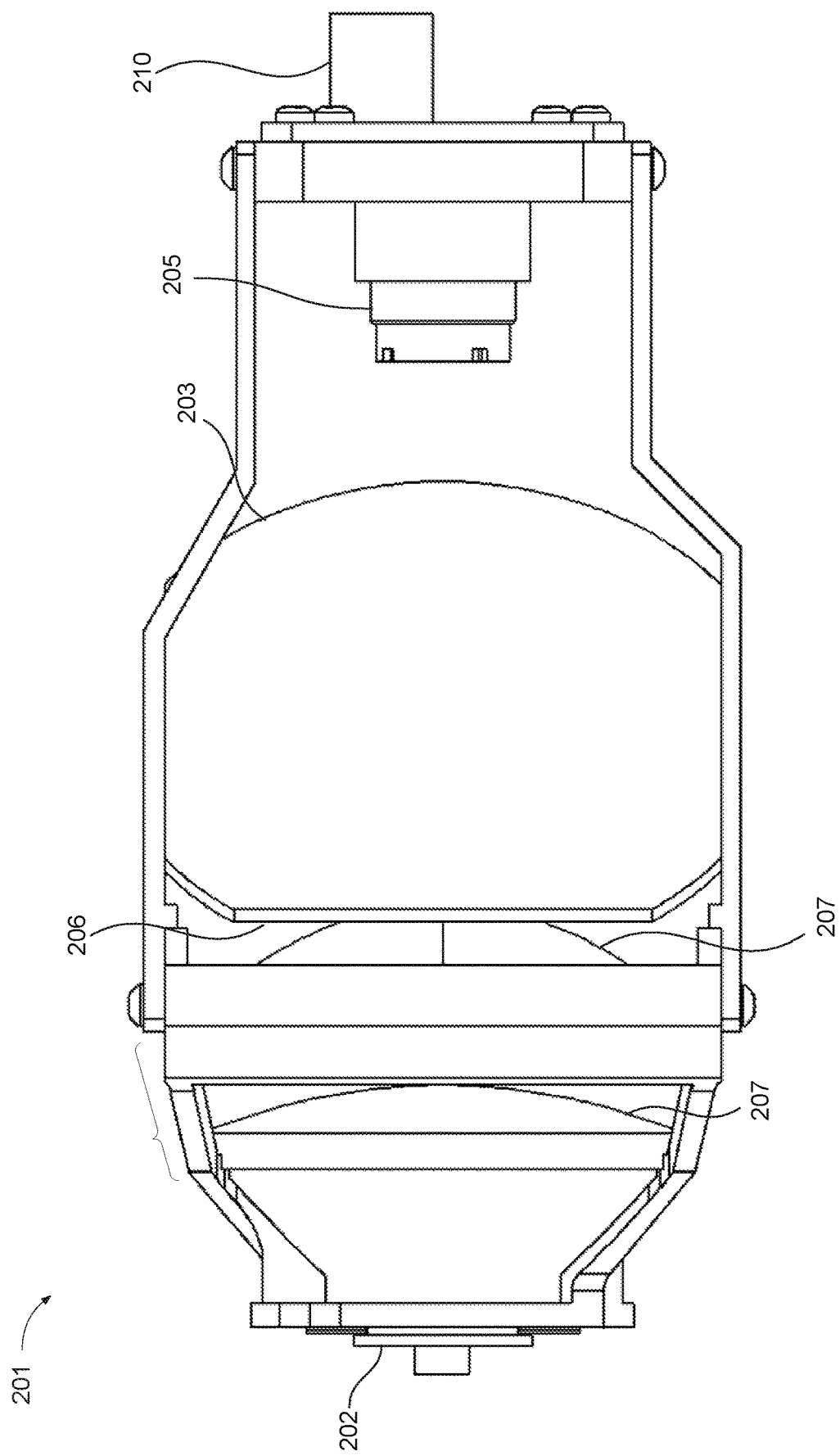
FIG. 2A is an example of a side cross-sectional view of a side-mounted optical module that can be used for this purpose in the AW-HMD device.

As mentioned above, the AW-HMD device 1 may include one or more optical modules to display images to the animal. FIG. 2A is an example of a side cross-sectional view of a side-mounted optical module that can be used for this purpose in the AW-HMD device 1. The view in FIG. 2A is from the perspective of the animal when the AW-HMD device 1 is being worn by the animal. The illustrated optical module 201 includes a computer-operated display 202 (such as, for example, an eMagin SXGA096-CFXL OLED display), a beamsplitter/combiner 203 with reflective coatings, a lens array 204 that includes a plurality of lenses and/or waveguides 207, and camera 205. Note that while the illustrated embodiments shows two lenses 207, other embodiments may have a different number of lenses, which could be just a single lens. The display 202 emits substantially uniform light that is generally directed towards the reflective beamsplitter/combiner 203, through the lens array 204. The camera 205 is aligned with the display 202 in the direction in which most light is emitted from the display 202.

A portion of the light that is emitted by the display 202 is reflected by the reflective beamsplitter/combiner 203 (perpendicularly to the plane of the drawing) into the eye of the animal (not shown). Another portion of that emitted light is passed through the beamsplitter/combiner 203 and captured by the camera 205, such that any images produced by the display 202 can be monitored and tracked in three-dimensional space by remote user interfaces and devices 3. Additionally, a portion of the light that impinges on the beamsplitter/combiner 203 from the animal's environment is reflected by the beamsplitter/combiner 203 to the camera 205, which provides images of the animal's optical perspective for transmission to remote user interfaces and devices 3.

Figure 4B:
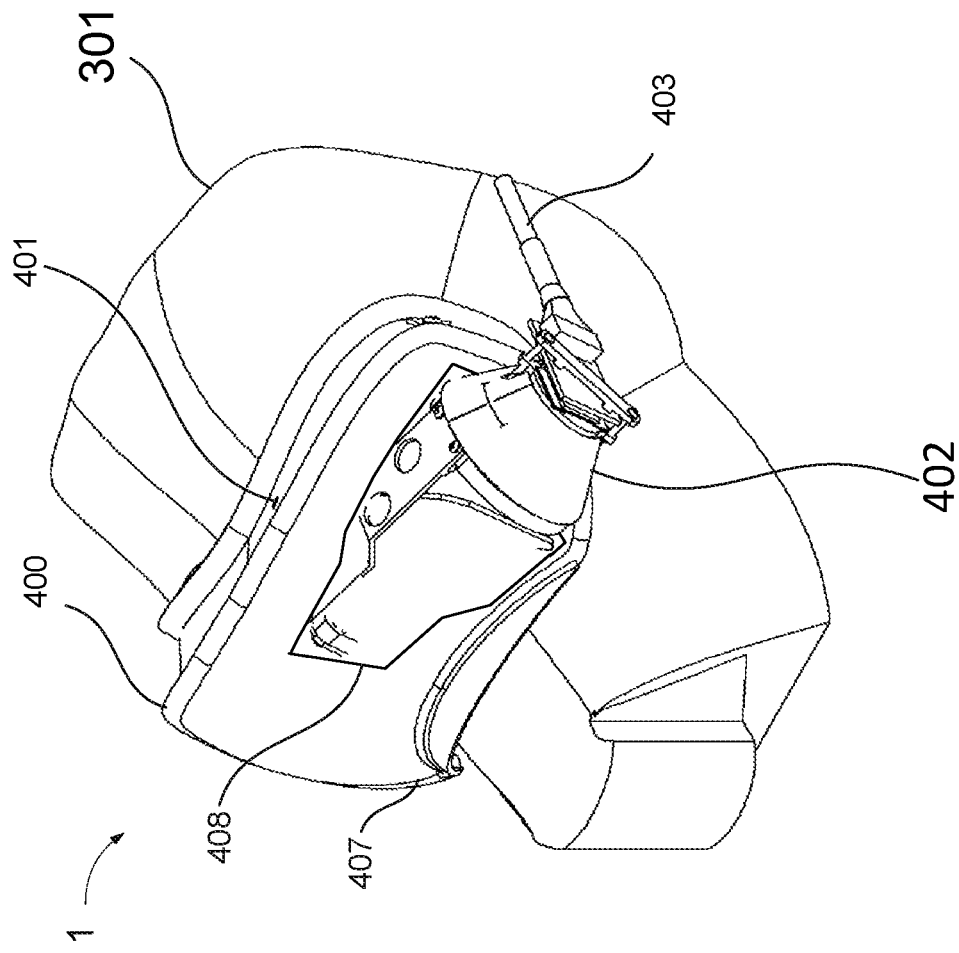
FIG. 4B shows a front/side perspective view of an embodiment in which the optical module is integrated with goggles.
Figure 4C:
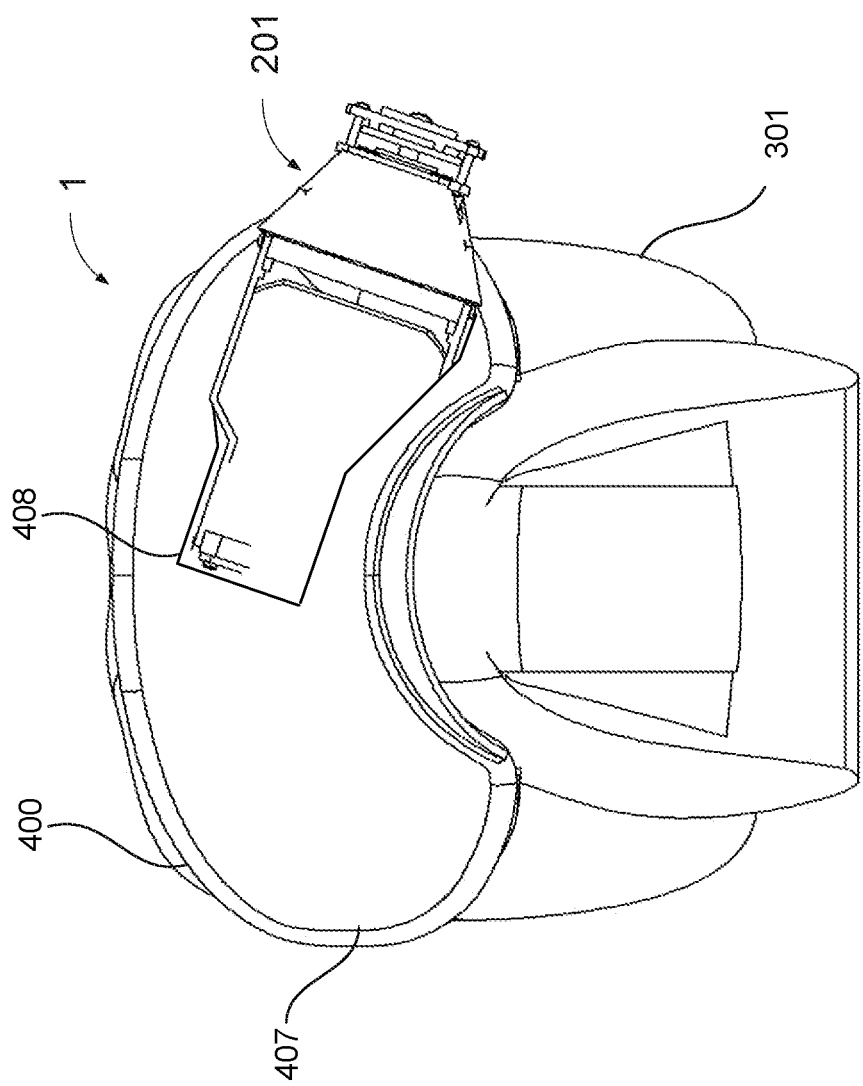
FIG. 4C shows a front view of an embodiment in which the optical module is integrated with goggles.

The optical module 201 can be lightweight and compact such that it fits into a small portion of an AW-HMD device 1. This allows integration of the optical module 201 into off-the-shelf canine goggles, such as canine goggles made by Rex Specs. An example of the manner of integration is illustrated in FIGS. 4A 4B and 4C, discussed further below. Note that other embodiments of the optical module 201 may instead have top-mounted or bottom-mounted configurations, with correspondingly modified configurations of the lens array 204 and beamsplitter/combiner 203.

Figure 2B:
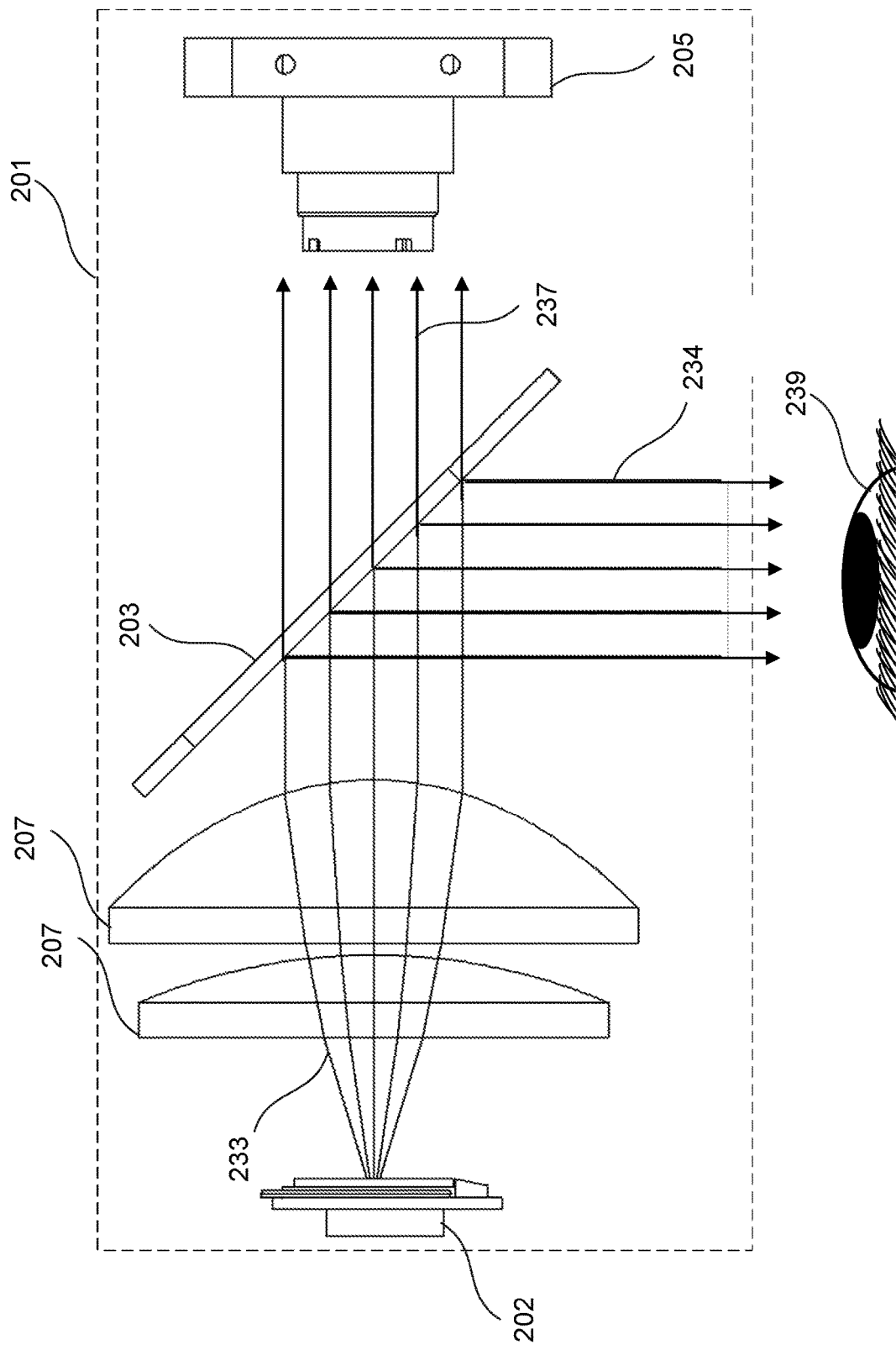
FIG. 2B schematically illustrates the operation of the optical module of FIG. 2A.

The manner of operation of the optical module of the AW-HMD 1 is further explained now with reference to FIG. 2B. Note that the illustrated features are not necessarily drawn to scale. In FIG. 2B, optical module 201 is viewed from a position either directly above or directly below the animal's head.

As mentioned above, in at least some embodiments displays digital image content to an eye 239 of an animal wearing the AW-HMD 1 and allows the animal to see through the display, such that the digital content is perceived by the animal as augmenting the animal's view of the surrounding environment, i.e., as augmented reality (AR) and/or mixed reality (MR) images. The optical configuration may have a variably transmissive optical element that is in-line with the animal's view of its surroundings, such that the degree of transmission of the see-through view can be increased and decreased. The variably transmissive optical element may be or include, for example, the beamsplitter/combiner 203 and/or one or more of the lenses 207. This feature may be helpful in situations where the animal would be better served with a high degree of transmission of see-through view and when, in the same AW-HMD device 1, the animal would be better served with a lower degree of transmission of see-through transmission. The lower degree of see-through transmission may be used, for example, in bright conditions and/or in conditions where higher contrast for the digitally presented objects are desirable.

The camera captures images (video and/or stills) of the surrounding environment by receiving reflected light from the surrounding environment off of the beamsplitter/combiner 203, which is in-line with the animal's see-through view of the surrounding. In some embodiments, the light emission surface of the display element 202 is enclosed by a light shield 402 (FIG. 4B), such that ambient light does not interfere with light reflected 237 and/or transmitted 233 in the direction of the camera 1001, which is captured by the camera 1001 to enable a remote user to view an image of where the object being displayed is being shown to the animal in three-dimensional space.

In some embodiments, as shown, the camera 205 aperture is perpendicular to the direction in which the animal is looking and directly aligned with the display element 202, as shown in FIGS. 2A and 2B. Image light 233 is emitted by the display element 202, and a portion 234 of that image light 233 is reflected toward the animal's eye 239 by the inward facing surface of the partially reflective beamsplitter/combiner 203. Most of the remaining portion 237 of the image light 233 from the display element 202 simply passes through the beamsplitter/combiner 203 to the camera 205 to capture the animal's view of the computer-generated images. Additionally, a portion of the light received from the animal's surrounding environment (not shown) is reflected off the outward facing surface of the beamsplitter/combiner 203 and into the camera 205, to capture the animal's view of its environment, while another portion of that light energy from the environment is passed through the beamsplitter/combiner 203 to the animal's eye 239.

In some embodiments, the beamsplitter/combiner 203 includes a coating on its surface that faces the camera 205, such that visible wavelength light is substantially transmitted while infrared light is substantially reflected; and the camera 205 captures images that include at least a portion of the infrared wavelength light. In such embodiments, the image light 233 includes visible wavelength light, and portion 237 of the visible wavelength light is transmitted by the beamsplitter/combiner 203. This may be useful to remote users through a networked connection 4 on remote interfaces and devices 3 to view the image presented by AW-HMD device 1 to the animal when in low-light conditions, for example.

As noted, the optical module 201 may contain a lens 207 or an array 204 of lenses 207, where light from the display element 202 is projected through the lens or lens array 204 onto the beamsplitter/combiner 203 to overlay objects onto the animal's view of the real world. Light control structures (not shown) can also be included to control the distribution of the light that is delivered by the display element 202. The light control structures can include, for example, diffusers, elliptical diffusers, prism films and lenticular lens arrays, prism arrays, cylindrical lenses, Fresnel lenses, refractive lenses, diffractive lenses or other structures that control the angular distribution of the image light 233.

Additionally, the optical module 201 is not limited to a side-mounted display nor to a monocular display. Other embodiments, for example, can be in a binocular display, whereby images and objects are displayed to both eyes simultaneously. Additionally, other embodiments may include a single, flexible reflexive surface, where images and objects are displayed directly onto that reflexive surface.

Figure 3A:
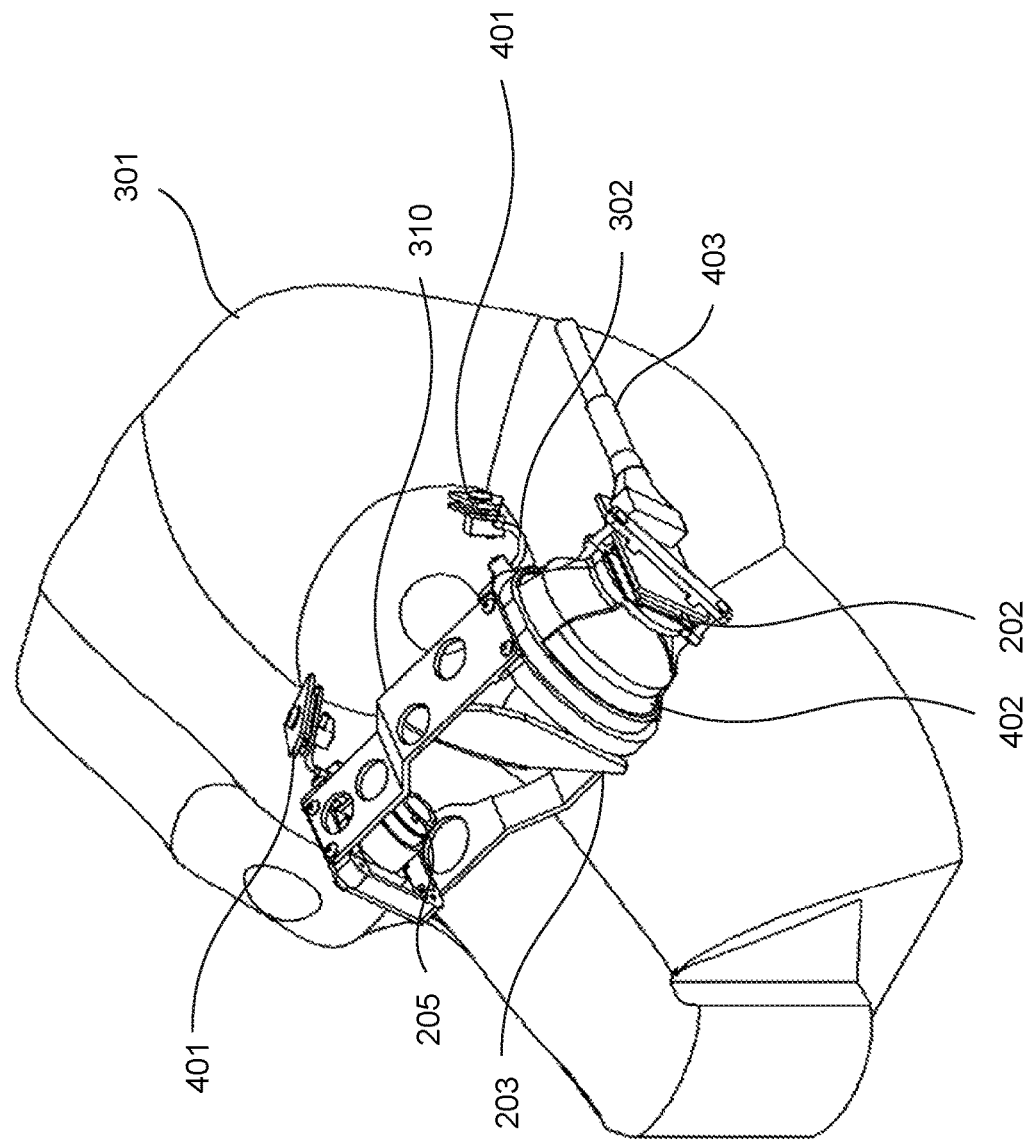
FIG. 3A shows a front/side perspective view of an embodiment of the AW-HMD device mounted on the head of an animal.
Figure 3B:
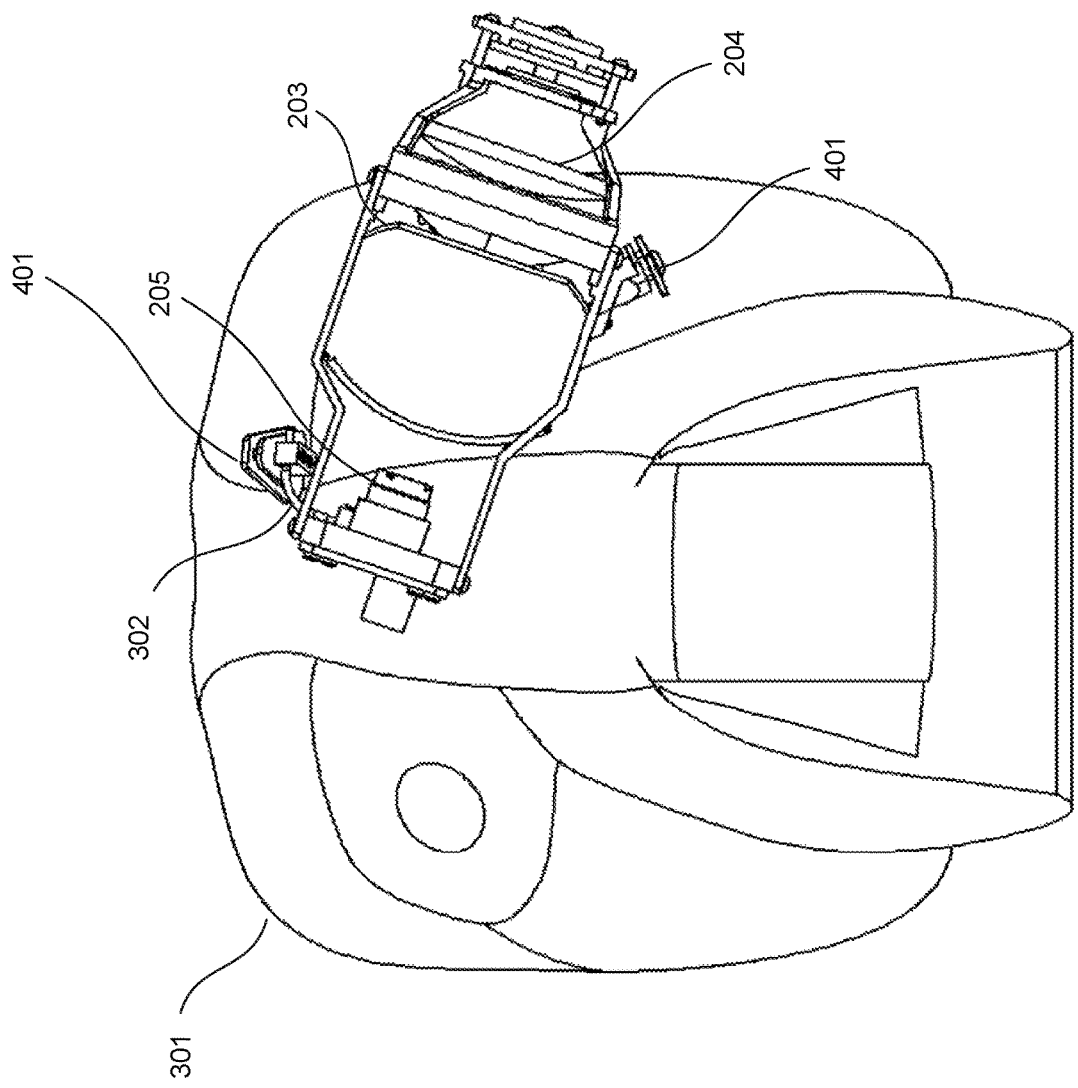
FIG. 3B shows a front view of the embodiment of AW-HMD device shown in FIG. 3A.

An embodiment of the optical system discussed with regard to FIGS. 2A and 2B can be seen in FIGS. 3A and 3B, showing an example of how the optical module 201 may be worn on the head 301 of a canine. The actual mounting mechanism, including goggles, is not shown in FIGS. 3A and 3B for clarity, but is shown in FIGS. 4A, 4B and 4C. The display element 202, beamsplitter/combiner 203, lens array 204 and camera 205 are coupled together by a pair of brackets 310. The lens array 204 (not visible in FIGS. 3A and 3B) may be covered by a light shield 402 to reduce interference from ambient light. A flexible cord 403 is used to provide power from a separate power supply (not shown) to the AW-HMD device 1 and to bi-directionally communicate data and control signals between the AW-HMD device 1 and a microprocessor and/or wireless transceiver (not shown). As discussed below, the power supply, microprocessor, memory and wireless transceiver may be mounted on or in a vest worn by the animal.

FIGS. 4A, 4B and 4C show three different views illustrating how the optical module 201 can be integrated with off-the-shelf canine goggles 400, such as those made by Rex Specs. Specifically, FIG. 4A shows a left-side view, FIG. 4B shows a top/left-side view, and FIG. 4C depicts a front view of such an embodiment. A region 408 can be cut out of the lens 407 of the goggles 400, through which the optical module 201 can be inserted and suspended so that the optical module 201 partially protrudes from the goggles 400, as shown. As shown, three mounts 401 can be used to secure the optical module 201 to the frame of the goggles 401 and suspend the optical module 201 in place. As shown, the mounts 401, which may include screws or other suitable fasteners, may be placed above the goggles lens, below the goggles lens, and to the side of the optical array 201, for example. Each of the mounts 401 attaches to one of the brackets 310 within the interior space of the goggles 400. Moreover, some embodiments may include adjustable mounting arms 302, such that appropriate adjustments can be made to align the optical module to the animal's eye. Moreover, to integrate the optical array 201 into the pre-existing goggles 400, modification to the front lens of the pre-existing goggles can be done, such that the optical array 201 partially protrudes outside of the finished goggle 400, while at the same time minimizing the opening.

Figure 4D:
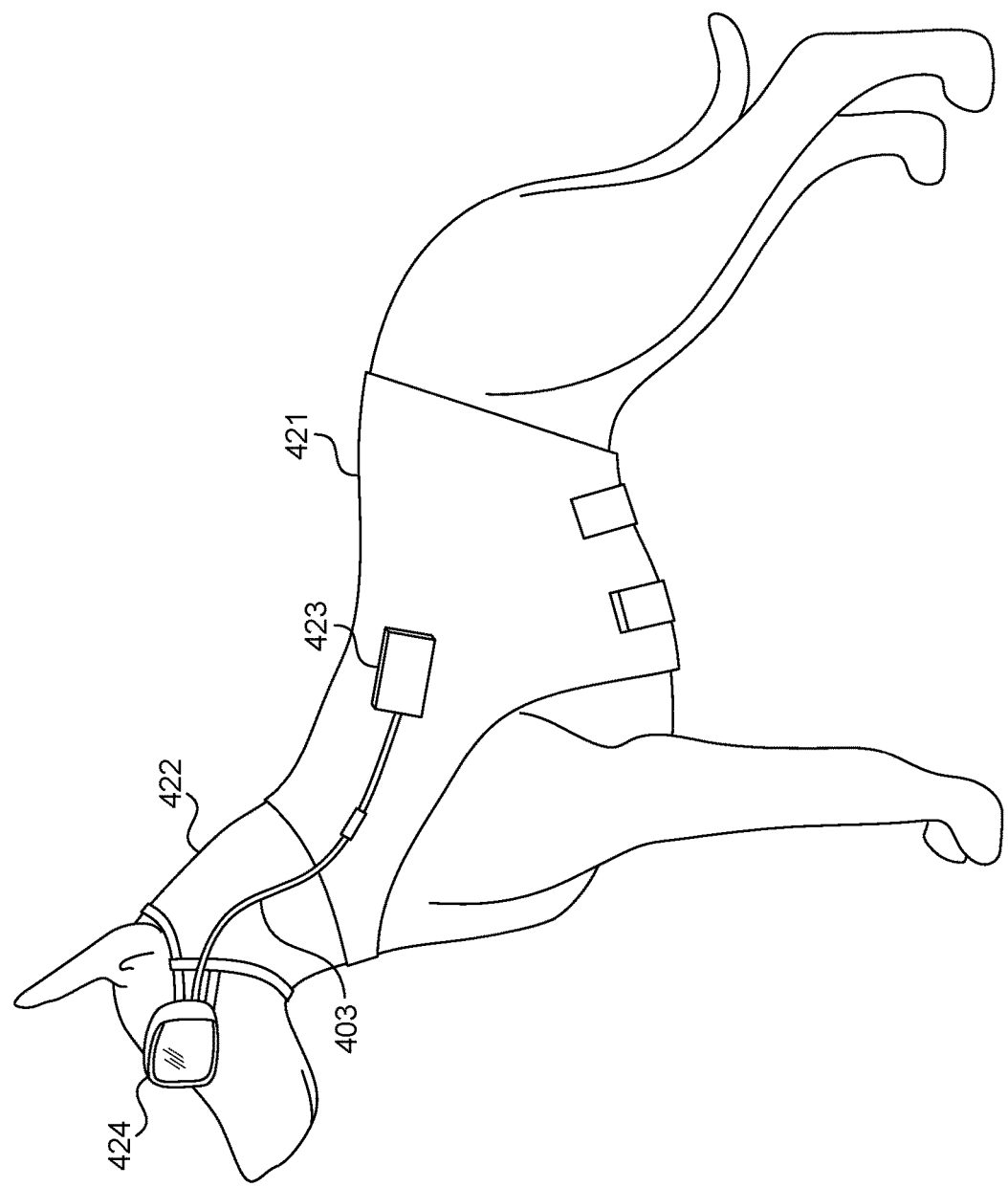
FIG. 4D shows an animal wearing the AW-HMD device, including headset and vest portions.

As shown in FIG. 4D, some of the components of the system may be mounted on or in a vest 421 worn by the animal 422, such as the power supply (e.g., battery), microprocessor, memory and wireless transceiver. These components may be contained within one or more physical modules 423 that are attached to the vest and connected to the headset portion 424 of the AW-HMD 1 by one or more cables 403 for providing power to the headset portion 424 and communicating data between the headset portion 424 and the components in the module(s) 423. In other embodiments, the one or more modules may communicate with and/or provide power to the headset portion 424 wirelessly.

Another consideration relating to integration of an optical module into an animal-worn form factor is the departure from traditional design principles that are based on a more-planar human face, to a design suitable for an animal with a less-planar face, such as a dog or other animal with a prominent snout. To account for these variants, the location of the optical array may need to be adjusted so that it can clear, in this present example, the snout of a canine. To enable this adjustment and to account for potential variants of an animal's facial features while also allowing for the best "eye-box" to be presented to the animal, in certain embodiments the mechanism used to mount the optical array 201 to the goggles 400 can allow for rotational adjustment of the optical array 201 relative to the goggles 400. With this rotation of the optical module 201, it is possible to adjust its positioning for protruding features, such as the animal's snout. To further account for such facial variations, a small portion 206 of the beamsplitter/combiner 203 can be cut off near an edge, as shown in FIG. 2A, such that an optical fit can be made, while maintaining the largest possible eye-box for the animal.

Figure 5:
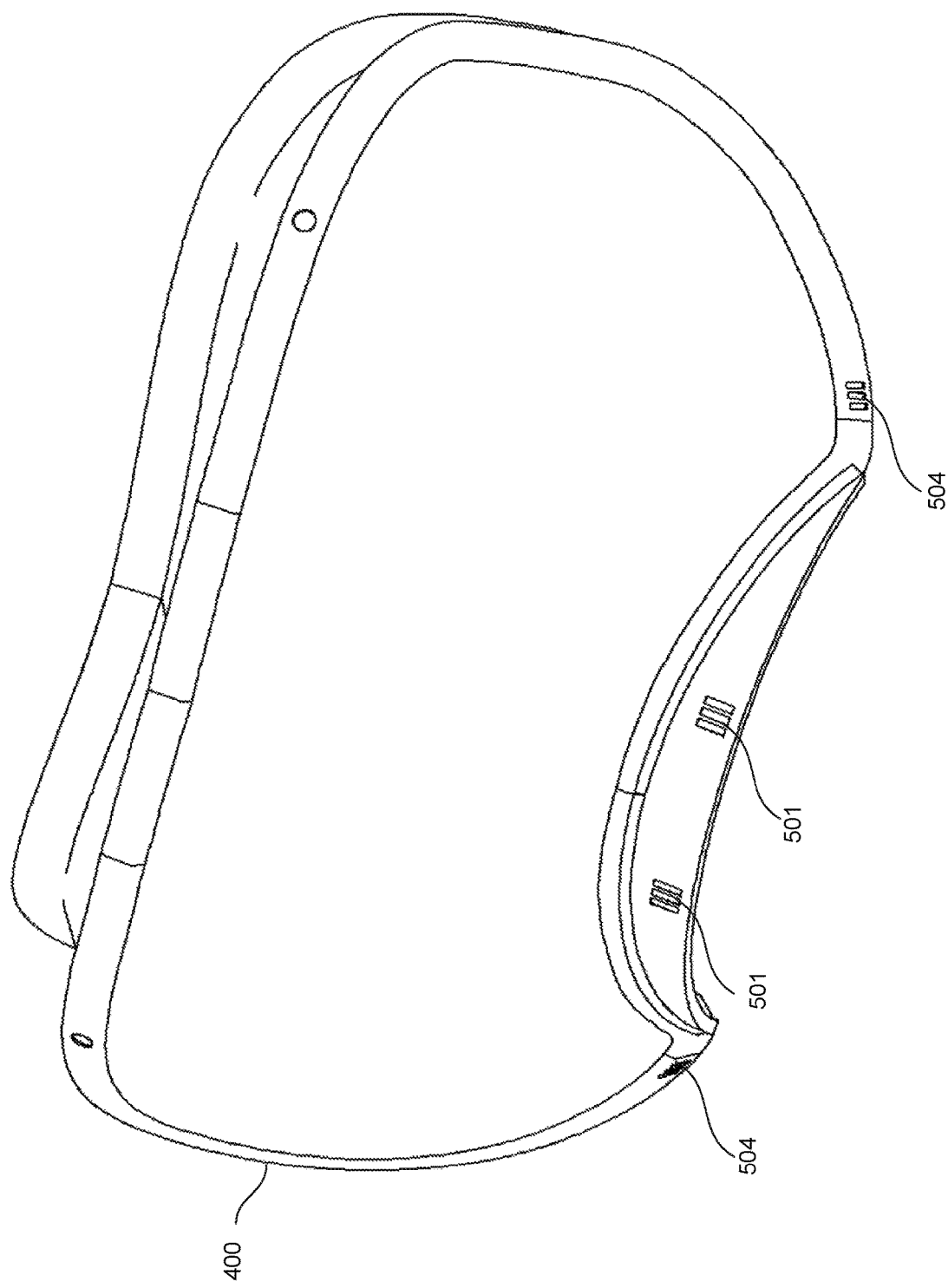
FIG. 5 shows an embodiment of AW-HMD device 1 with olfactory and tactile enhancement and detection capability.

FIG. 5 shows an embodiment of AW-HMD device 1 with olfactory enhancement and detection capability (to facilitate illustration, the optical module is not shown in this view, but would be present in an actual device). The olfactory sense and response elements 501 enable a remote human user to deliver olfactory cues to the animal and to receive olfactory or olfactory-based cues from the AW-HMD device 1, each via a network connection 4 and remote user interfaces and devices 3. Elements 501 have a wired or wireless (e.g., Bluetooth) connection (not shown) with a microprocessor and/or long-range wireless transceiver (not shown) on the AW-HMD device 1. These elements enable a handler to detect scents, passively, or actively, in the environment by allowing air to naturally be inducted or through vacuuming air into the scent discrimination system in the AW-HMD device 1. Additionally or alternatively, the olfaction system may deliver scent cues to the animal to direct the animal or otherwise elicit a scent-based response. In some instances the AW-HMD device 1 and its associative computing elements may be able to deliver scent cues to the animal automatically (i.e., not in response to a direct human input), having previously been programmed by a remote user with the appropriate scent detection profile and response.

FIG. 5 also shows an embodiment of the AW-HMD device 1 with tactile (e.g., haptic) sensing and feedback capability. The haptic sensors/feedback elements 504 may enable a remote user through a networked connection 4 on an remote user interface or device 3 to deliver haptic feedback to the animal, e.g., to control the animal's direction of movement or gaze. Additionally, through the use of associative computing power, accelerometers and like in the AW-HMD device 1, the AW-HMD device 1 may also be able to deliver haptic feedback to a remote user through a networked connection 4, based on predetermined inertial measurements that may be recorded via the AW-HMD device 1. Haptic feedback, for the AW-HMD device 1 or remote user may include the application of force, vibrations and/or other subtle movements. Elements 504 can be assumed to have a wired or wireless connection with an on-board microprocessor and/or wireless transceiver on the AW-HMD device 1.

Figure 6:
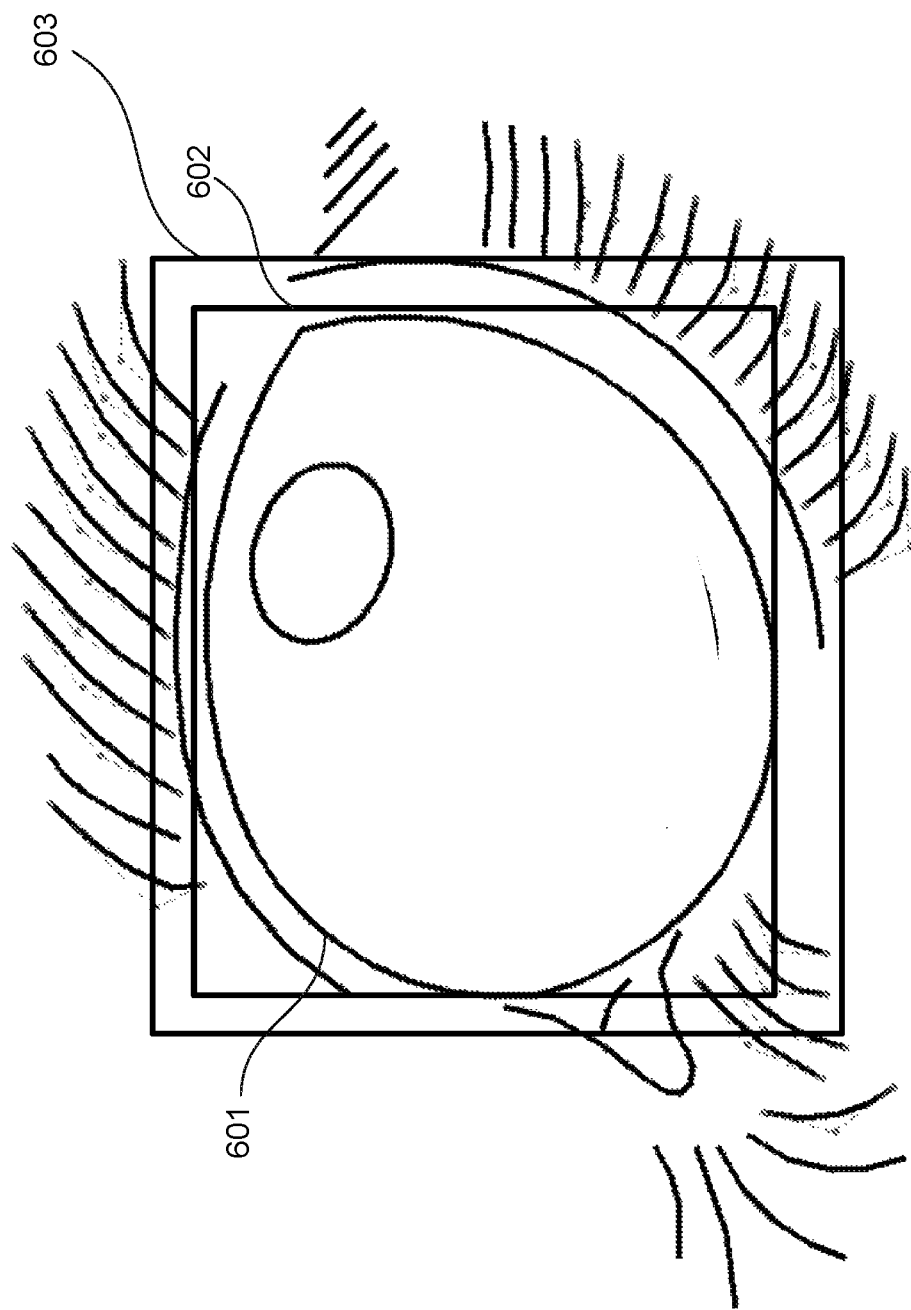
FIG. 6 shows a canine eye to illustrate certain principles of eye-tracking.

FIG. 6 shows a canine eye to illustrate how eye-tracking can be done in accordance with the technology introduced here. An embodiment of the AW-HMD device 1 with eye-tracking capability may incorporate at least two cameras, including an eye camera to capture an image of the animal's eye and a second camera to capture images of the animal's environment. The figure depicts the pupil of the eye 601 with a pupil tracking area 602, and a spot search area 603 for tracking the relation of the pupil within the eye-box, such that if the pupil 601 changes in relation to the eye-box, the corresponding FOV may be relayed to remote user interfaces and devices 3.

Figure 7:
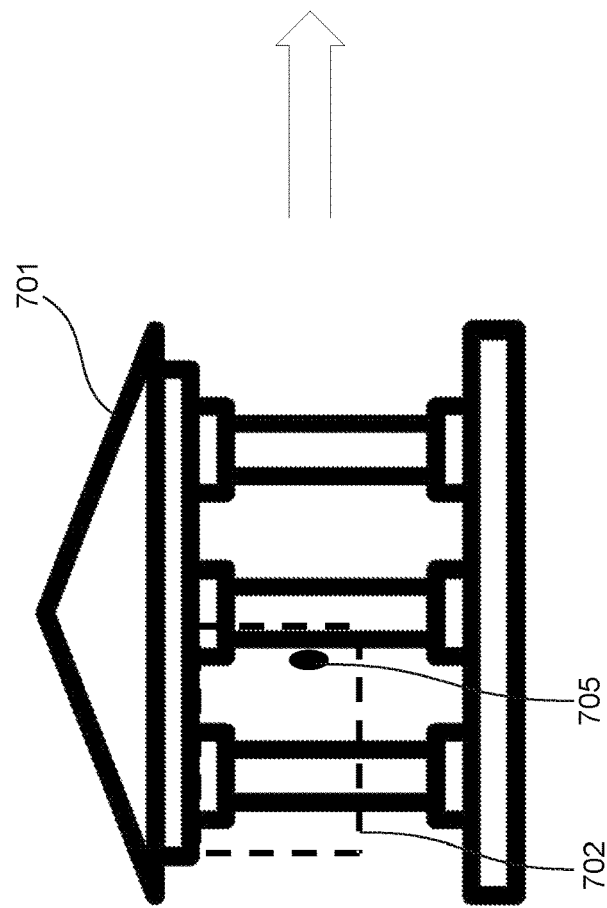
FIG. 7 depicts an example of a scenario that may be encountered during use of the AW-HMD device.
Figure 7:
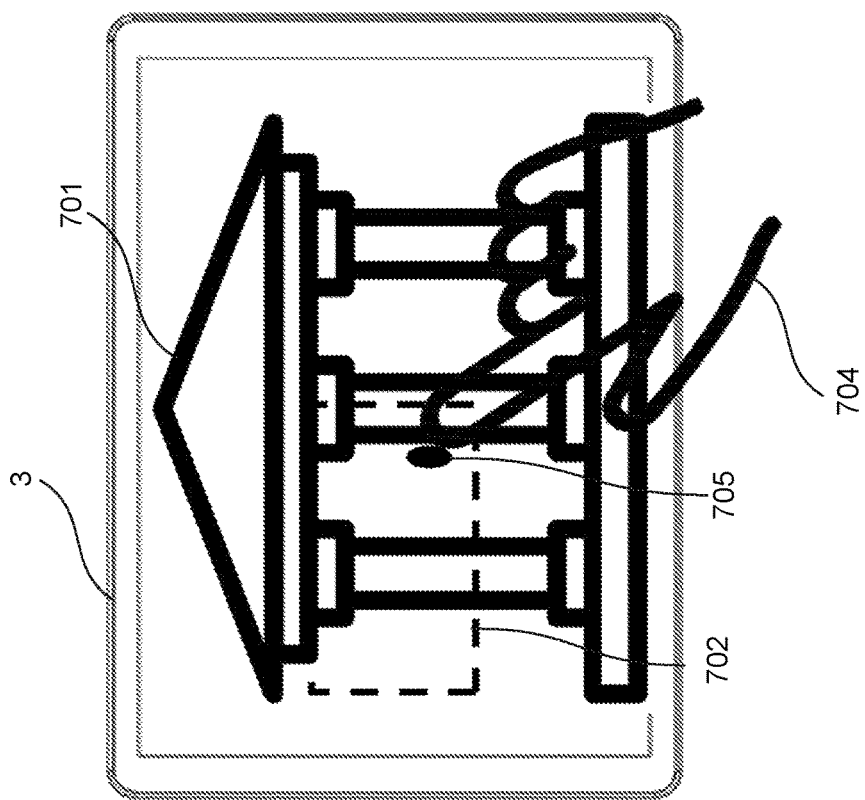

FIG. 7 depicts a scenario that may be encountered during use of the AW-HMD device 1. In this embodiment, the animal wearing the AW-HMD device 1 is viewing a building 701. The FOV of the animal that can be addressed by the AW-HMD device 1, in particular by the optical module 201, is represented by dotted box 702. Through a remote user interface and device 3, a remote user 704 can view (via a networked connection 4) the FOV addressable by the optical module 201, as represented by the dotted box 702. In addition, through the camera sensor on AW-HMD device 1, the remote user 704 may also view beyond the optical module and the animal's immediate FOV. Additionally, the remote user 704 may input into the optical module 201 (e.g., through speech or some physical action on the remote user interface and device 3) to highlight areas in the addressable FOV 702 of the optic that can be perceived by the animal, which in this instance is shown as a dot 705.

Moreover, the AW-HMD device 1 is not limited to being able to highlight objects in the physical world that are in the immediate and direct FOV of the optical module 201. The technology introduced here can also enable a remote user to tag or otherwise direct their input to subject matter outside of the animal's current FOV through the optical module 201 but within the FOV of a camera of the AW-HMD device 1. For example, the remote user can "tag" an area or object within the addressable FOV of the camera on the user interface 3 but outside the animal's FOV through the optical module 201, which may cause the AW-HMD device 1 to direct the animal (e.g., through haptic or audible signal) to adjust its head position, to bring the tagged area/object within the animal's FOV through the optical module 201.

Figure 8:
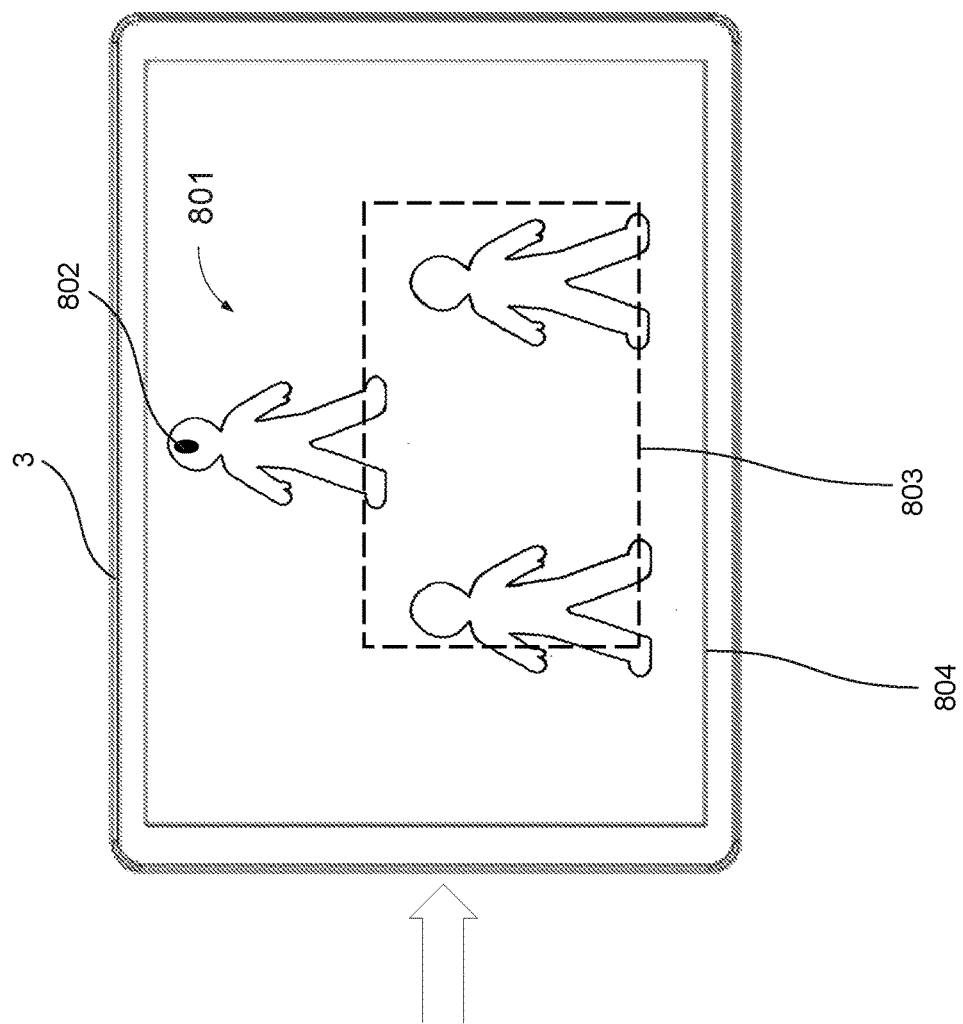
FIG. 8 depicts another example of a scenario that may be encountered during use of the AW-HMD device.
Figure 8:
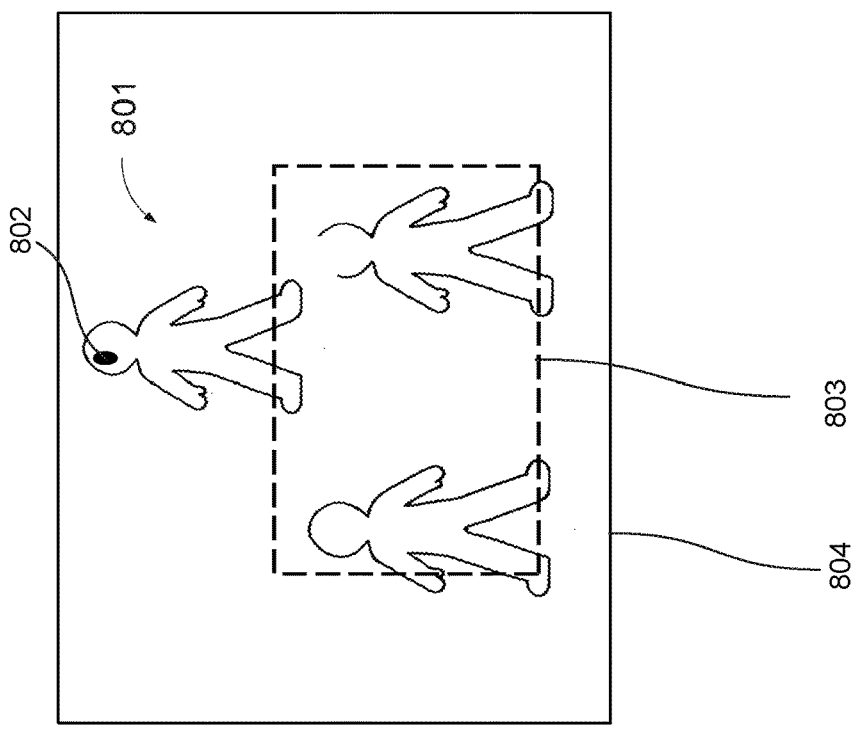

FIG. 8 depicts another use scenario, in which the animal wearing the AW-HMD device 1 encounters a group of people 901, and the AW-HMD device 1, through object and facial recognition, overlays a cue (e.g., a dot) 802 on a user-designated object (e.g., a specific person), even though the object is not within the FOV 803 of the optical module 201. This may occur when the camera in the AW-HMD device 1, having a larger FOV 804 than the FOV 803 of the optical module 201, detects a desirable object and tags the object such that the optical module 201 can activate as soon as the object is in the animal's FOV. An example in which this may be desirable is where a law enforcement unit sends a dog wearing the AW-HMD device 1 into a hostile environment for surveillance. In this case, the law enforcement officers may be unaware of hostiles in the area being surveilled. However, because of the AW-HMD device 1 and its associative computing capabilities, if the dog were to come into contact with a hostile group and a member of that group were to be identified as a "wanted" target, the system may automatically select that "wanted" individual as the desired target to apprehend, as shown by the cue 802. By doing so, the AW-HMD device 1 may allow for trained animals to have higher mission capabilities, since they are no longer as reliant on the human handler for cues. Additionally, embodiments may also allow a remote user to view the objects being tagged through a networked connection 4, as shown.

Figure 9:
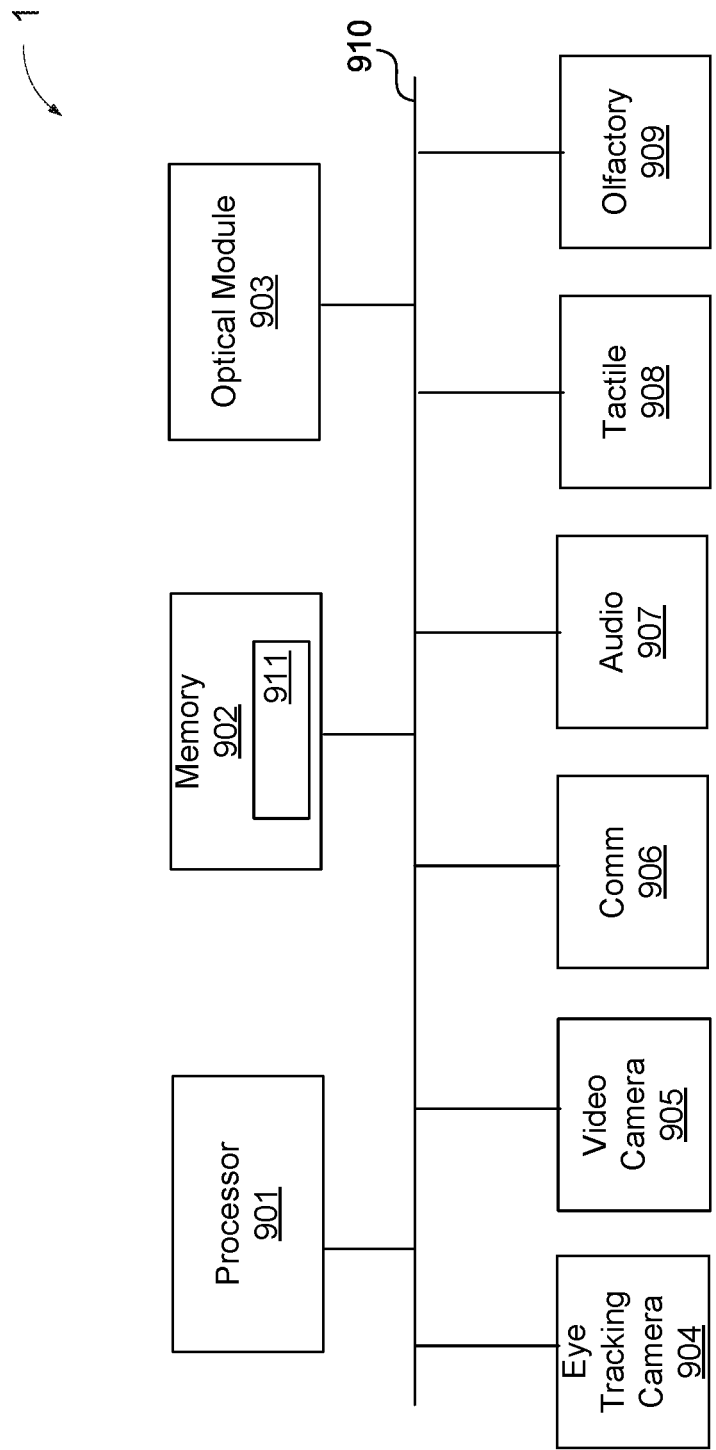
FIG. 9 is a block diagram of the major components of the AW-HMD device according to at least one embodiment.

FIG. 9 is a high-level block diagram showing the major components of the AW-HMD device 1 according to at least one embodiment. Note that other embodiments of the AW-HMD device 1 may not include all of the components shown in FIG. 9, and/or may include additional components not shown in FIG. 9.

In the illustrated embodiment, the physical components of the AW-HMD device 1 include one or more of each of: a processor 901, a memory 902, an optical module 903, an eye-tracking video camera 904, a video camera 905 for imaging the animal's environment in the animal's line of sight, a communication subsystem 906, an audio subsystem 907, a tactile subsystem 908, and an olfactory subsystem 909, all coupled together (directly or indirectly) by an interconnect 910. Note that in some embodiments, one or more of these components may be located off the headset portion of the AW-HMD device 1, such as on a vest worn by the animal, as shown and described with reference to FIG. 4D.

The interconnect 910 may be or include one or more conductive traces, buses, point-to-point connections, controllers, adapters, wireless links and/or other conventional connection devices and/or media, at least some of which may operate independently of each other.

The processor(s) 901 individually and/or collectively control the overall operation of the AW-HMD device 1 and perform various data processing and control functions. For example, the processor(s) 901 may provide at least some of the computation and data processing functionality for generating and displaying computer-generated images to the animal and/or for providing other signals to the animal (e.g., auditory, olfactory or haptic). Each processor 901 can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Data and instructions (code) 911 that configure the processor(s) 901 to execute aspects of the mixed-reality visualization technique introduced here can be stored in the one or more memories 902. Each memory 902 can be or include one or more physical storage devices, which may be in the form of random access memory (RAM), read-only memory (ROM) (which may be erasable and programmable), flash memory, miniature hard disk drive, or other suitable type of storage device, or a combination of such devices.

The optical module 903 may include one or more active display elements (e.g., an OLED display) and associated optics, for displaying computer-generated images to the animal. The communication subsystem 906 enables the AW-HMD device 1 to receive data and/or commands from, and send data and/or commands to, a remote processing system, such as remote user interfaces and devices 3. The communication subsystem 906 can be or include one or more of, for example, a Wi-Fi transceiver, cellular transceiver (e.g., LTE/4G or 5G), Bluetooth or Bluetooth Low Energy (BLE) transceiver, baseband processor, a universal serial bus (USB) adapter, Ethernet adapter, cable modem, DSL modem, or the like, or a combination thereof.

The audio subsystem 907 can be or include one or more speakers and/or one or more microphones. The tactile subsystem 908 may be or include one or more haptic actuators to provide haptic signals to the animal, and/or one or more haptic sensors by which to provide haptic feedback to a remote human user. The olfactory subsystem 909 may be or include one or more olfactory delivery elements to provide olfactory signals to the animal, and/or one or more olfactory sensors by which to provide olfactory feedback to a remote human user.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

EXAMPLES OF CERTAIN EMBODIMENTS

Certain embodiments of the technology introduced herein are summarized in the following numbered examples:

1. A head-mountable display device comprising: a head fitting designed to fit the head of an animal; and an output subsystem coupled to or integral with the head fitting and configured to output a signal to the animal.

2. A head-mountable display device as recited in example 1, wherein the output subsystem comprises an optical module configured to project an image into an eye of the animal.

3. A head-mountable display device as recited in any of example 1 or example 2, wherein the optical module comprises a display element that is at least partially transparent, on which to overlay augmented reality images and/or mixed reality images on the animal's view of the real world.

4. A head-mountable display device as recited in any of examples 1 through 3, wherein the optical module is configured to display images using shapes and colors optimized for visual perception capabilities of a particular animal species.

5. A head-mountable display device as recited in any of examples 1 through 4, wherein the optical module is configurable to generate images conforming to a plurality of different visual acuity and visual perception requirements for a plurality of different animal species.

6. A head-mountable display device as recited in any of examples 1 through 5, wherein the output subsystem comprises an audio output device.

7. A head-mountable display device as recited in any of examples 1 through 6, wherein the output subsystem comprises a tactile output device.

8. A head-mountable display device as recited in any of examples 1 through 7, wherein the output subsystem comprises an olfactory output device.

9. A head-mountable display device as recited in any of examples 1 through 8, wherein the output subsystem comprises at least two from the list consisting of: an optical module configured to project an image into an eye of the animal an audio output device; a tactile output device; or an olfactory output device.

10. A head-mountable display device as recited in any of examples 1 through 9, further comprising a camera arranged to perform eye tracking of an eye of the animal.

11. A head-mountable display device as recited in any of examples 1 through 10, further comprising a wireless receiver to receive a wireless communication signal via a wireless communication link in response to a user input from a remote user, the wireless communication signals for controlling a function of the head-mountable display device.

12. A head-mountable display device as recited in any of examples 1 through 11, wherein the output system includes an output device controllable by the remote user via the wireless communication signal, to provide the signal to the animal.

13. A head-mountable display device as recited in any of examples 1 through 12, wherein the signal to the animal is a visual signal.

14. A head-mountable display device as recited in any of examples 1 through 13, wherein the signal to the animal is an auditory signal.

15. A head-mountable display device as recited in any of examples 1 through 14, wherein the signal to the animal is a tactile signal.

16. A head-mountable display device as recited in any of examples 1 through 15, wherein the signal to the animal is an olfactory signal.

17. A head-mountable display device as recited in any of examples 1 through 16, further comprising: a camera arranged to acquire viewpoint images corresponding to a visual perspective of the animal; and a wireless transmitter configured to transmit image data representing the viewpoint images to a remote device.

18. A head-mountable display device comprising: a head fitting designed to fit the head of an animal; an optical module configured to project an image into an eye of the animal, wherein the optical module includes a display element that is at least partially transparent, on which to overlay augmented reality images and/or mixed reality images on the animal's view of the real world; and at least two from the list consisting of: an audio output device, a tactile output device and an olfactory output device.

19. A head-mountable display device as recited in example 18, further comprising a wireless receiver to receive a wireless communication signal via a wireless communication link in response to a user input from a remote user, the wireless communication signals for controlling a function of the head-mountable display device.

20. A head-mountable display device as recited in example 18 or example 19, wherein the function is one of a visual signal to the animal, an auditory signal to the animal, a tactile signal to the animal or an olfactory signal to the animal.

21. A head-mountable display device as recited in any of examples 18 through 20, further comprising: a camera arranged to acquire viewpoint images corresponding to a visual perspective of the animal; and a wireless transmitter configured to transmit image data representing the viewpoint images to a remote device.

22. A method of operation of a head-mountable display device designed to be worn by an animal, the method comprising: projecting a plurality of images into an eye of the animal from a display element mounted to the head of the animal; receiving, via a wireless communication link, a control signal from a remote user; and generating an output signal to the animal based on the control signal.

23. A method as recited in example 22, wherein the output signal is included in the plurality of images.

24. A method as recited in example 22 or example 23, wherein the output signal is a non-visual signal.

25. A method as recited in any of examples 22 through 24, wherein the output signal is an audible signal.

26. A method as recited in any of examples 22 through 25, wherein the output signal is a tactile signal.

27. A method as recited in any of examples 22 through 26, wherein the output signal is an olfactory signal.

28. A method as recited in any of examples 22 through 27, further comprising: acquiring viewpoint images corresponding to a visual perspective of the animal; and transmitting image data representing the viewpoint images from the device to a remote device.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A head-mountable display device comprising:
   a goggles designed to fit the head of an animal, the goggles including a frame that rests against the head of the animal when the head-mountable display device is worn by the animal, the goggles further including a lens supported by the frame, the lens having an opening therein;
   a plurality of brackets coupled to the frame of the goggles; and
   an output subsystem configured to output a signal to the animal, the output subsystem including an active display element and a beamsplitter/combiner collectively configured to project an image into an eye of the animal when the head-mountable display device is in operation, the active display element and the beamsplitter/combiner each coupled to the plurality of brackets, wherein the beamsplitter/combiner is aligned with the opening in the lens along a line of sight of the animal when the head-mountable display device is worn by the animal.

2. A head-mountable display device as recited in claim 1, wherein the beamsplitter/combiner comprises a display element that is at least partially transparent, on which to overlay augmented reality images and/or mixed reality images on the animal's view of the real world.

3. A head-mountable display device as recited in claim 1, wherein the output subsystem is configured to display images using shapes and colors optimized for visual perception capabilities of a particular animal species.

4. A head-mountable display device as recited in claim 1, wherein the output subsystem is configurable to generate images conforming to a plurality of different visual acuity and visual perception requirements for a plurality of different animal species.

5. A head-mountable display device as recited in claim 1, wherein the output subsystem comprises an audio output device.

6. A head-mountable display device as recited in claim 1, wherein the output subsystem comprises a tactile output device.

7. A head-mountable display device as recited in claim 1, wherein the output subsystem comprises an olfactory output device.

8. A head-mountable display device as recited in claim 1, wherein the output subsystem comprises at least two from the list consisting of:
   an audio output device;
   a tactile output device; or
   an olfactory output device.

9. A head-mountable display device as recited in claim 1, further comprising a camera arranged to perform eye tracking of an eye of the animal.

10. A head-mountable display device as recited in claim 1, further comprising a wireless receiver to receive a wireless communication signal via a wireless communication link in response to a user input from a remote user, the wireless communication signals for controlling a function of the head-mountable display device.

11. A head-mountable display device as recited in claim 1, wherein the output system includes an output device controllable by the remote user via the wireless communication signal, to provide the signal to the animal.

12. A head-mountable display device as recited in claim 11, wherein the signal to the animal is a visual signal.

13. A head-mountable display device as recited in claim 11, wherein the signal to the animal is an auditory signal.

14. A head-mountable display device as recited in claim 11, wherein the signal to the animal is a tactile signal.

15. A head-mountable display device as recited in claim 11, wherein the signal to the animal is an olfactory signal.

16. A head-mountable display device as recited in claim 1, further comprising:
   a camera arranged to acquire viewpoint images corresponding to a visual perspective of the animal; and
   a wireless transmitter configured to transmit image data representing the viewpoint images to a remote device.

17. A head-mountable display device comprising:
   a goggles designed to fit the head of an animal, the goggles including a frame that rests against the head of the animal when the head-mountable display device is worn by the animal, the goggles further including a lens supported by the frame, the lens having an opening therein;
   a plurality of brackets coupled to the frame of the goggles; and
   an optical module configured to project an image into an eye of the animal, wherein the optical module includes a display element that is at least partially transparent, on which to overlay augmented reality images and/or mixed reality images on the animal's view of the real world, the optical module including an active display element and a beamsplitter/combiner collectively configured to project an image into an eye of the animal when the head-mountable display device is in operation, the active display element and the beamsplitter/combiner each coupled to the plurality of brackets, wherein the beamsplitter/combiner is aligned with the opening in the lens along a line of sight of the animal when the head-mountable display device is worn by the animal;

at least two from the list consisting of: an audio output device, a tactile output device and an olfactory output device.

18. A head-mountable display device as recited in claim 17, further comprising a wireless receiver to receive a wireless communication signal via a wireless communication link in response to a user input from a remote user, the wireless communication signals for controlling a function of the head-mountable display device.

19. A head-mountable display device as recited in claim 18, wherein the function is one of a visual signal to the animal, an auditory signal to the animal, a tactile signal to the animal or an olfactory signal to the animal.

20. A head-mountable display device as recited in claim 17, further comprising:

a camera arranged to acquire viewpoint images corresponding to a visual perspective of the animal; and a wireless transmitter configured to transmit image data representing the viewpoint images to a remote device.

\* \* \* \* \*